US012047754B2

(12) United States Patent
Kanemaru

(10) Patent No.: US 12,047,754 B2
(45) Date of Patent: Jul. 23, 2024

(54) SOUND SOURCE LOCALIZATION APPARATUS, SOUND SOURCE LOCALIZATION METHOD AND STORAGE MEDIUM

(71) Applicant: Audio-Technica Corporation, Tokyo (JP)

(72) Inventor: Shinken Kanemaru, Tokyo (JP)

(73) Assignee: AUDIO-TECHNICA CORPORATION, Tokyo (JP)

( * ) Notice: Subject to any disclaimer, the term of this patent is extended or adjusted under 35 U.S.C. 154(b) by 260 days.

(21) Appl. No.: 17/696,970

(22) Filed: Mar. 17, 2022

(65) Prior Publication Data

US 2022/0210553 A1 Jun. 30, 2022

Related U.S. Application Data

(63) Continuation of application No. PCT/JP2021/034092, filed on Sep. 16, 2021.

(30) Foreign Application Priority Data

Oct. 5, 2020 (JP) ................................ 2020-168766

(51) Int. Cl.
*H04R 3/00* (2006.01)
*H04R 5/04* (2006.01)

(52) U.S. Cl.
CPC ............... *H04R 3/005* (2013.01); *H04R 5/04* (2013.01); *H04R 2430/23* (2013.01)

(58) Field of Classification Search
CPC ...... H04R 3/005; H04R 5/04; H04R 2430/23; H04R 2430/03; H04R 1/406; H04R 1/40; H04R 3/00; G10L 25/51; G01S 5/20
See application file for complete search history.

(56) References Cited

U.S. PATENT DOCUMENTS 10,042,038 B1 * 8/2018 Lord ........................ G10L 25/51
10,726,830 B1 * 7/2020 Mandal ................... G10L 15/16
(Continued)

FOREIGN PATENT DOCUMENTS

JP H06-195097 A 7/1994
JP H06195097 A 7/1994
(Continued)

OTHER PUBLICATIONS

Daisuke et al: "Moving sound source localization based on sequential subspace estimation in actual room environments", Electronics and Communications, Japan, Scripta Technica. New York, US, vol. 94, No. 7, Jul. 1, 2011 (Jul. 1, 2011), pp. 17-26.*
(Continued)

*Primary Examiner* — Oyesola C Ojo
(74) *Attorney, Agent, or Firm* — WC&F IP

(57) ABSTRACT

A sound source localization apparatus 2 includes a sound signal vector generation part 21 that generates a sound signal vector based on a plurality of electrical signals outputted from a plurality of microphones 11 that receive a sound generated by a sound source, a subspace identification part 22 that identifies a signal subspace corresponding to a signal component included in the sound signal vector and a noise subspace corresponding to a noise component included in the sound signal vector, a candidate identification part 23 that identifies one or more candidate vectors indicating a plurality of candidates of a direction of the sound source, and a direction identification part 24 that identifies, as the direction of the sound source, a direction, on the basis of an optimization objective function including a sum of squares of an inner product of the signal subspace and the noise subspace.

12 Claims, 5 Drawing Sheets

(56) References Cited

U.S. PATENT DOCUMENTS

| | | | | |
|---|---|---|---|---|
| 10,917,724 | B1* | 2/2021 | Chen | H04R 5/04 |
| 10,924,846 | B2* | 2/2021 | Wolff | G10L 21/0216 |
| 11,393,473 | B1* | 7/2022 | Fenster | G06F 3/167 |
| 11,574,628 | B1* | 2/2023 | Kumatani | G06N 3/084 |
| 11,830,471 | B1* | 11/2023 | Mansour | H04R 29/005 |
| 2008/0232192 | A1* | 9/2008 | Williams | H04R 1/406 367/8 |
| 2010/0316231 | A1* | 12/2010 | Williams | H04R 3/005 381/92 |
| 2012/0155703 | A1* | 6/2012 | Hernandez-Abrego | A63F 13/213 382/103 |
| 2012/0263315 | A1 | 10/2012 | Hiroe | |
| 2016/0216363 | A1* | 7/2016 | Martin | G01S 3/801 |
| 2018/0249267 | A1* | 8/2018 | Klingler | H04R 29/005 |
| 2018/0261237 | A1* | 9/2018 | Moore | G10L 25/51 |
| 2020/0218501 | A1* | 7/2020 | Fridman | G10L 25/51 |
| 2021/0035597 | A1* | 2/2021 | Eubank | H04S 7/304 |
| 2021/0098014 | A1* | 4/2021 | Tanaka | G10K 11/34 |
| 2021/0256990 | A1* | 8/2021 | Guerin | H04R 1/406 |
| 2021/0333423 | A1* | 10/2021 | Raghukumar | G01S 5/20 |
| 2022/0060820 | A1* | 2/2022 | Tourbabin | G01S 3/803 |

FOREIGN PATENT DOCUMENTS

| | | | |
|---|---|---|---|
| JP | 2012-234150 | A | 11/2012 |
| JP | 2012234150 | A | 11/2012 |
| JP | 6623185 | B2 | 12/2019 |

OTHER PUBLICATIONS

Daisuke Tsuji and Kenji Suyama: "Moving sound source localization based on sequential subspace estimation in actual room environments", Electronics and Communications in Japan, Scripta Technica. New York, US, vol. 94, No. 7, Jul. 1, 2011 (Jul. 1, 2011), pp. 17-26.

E Feng-Xiang et al: "Target detection and tracking via structured convex optimization", 2017 IEEE International Conference on Acoustics, Speech and Signal Processing (ICASSP), IEEE, Mar. 5, 2017 (Mar. 5, 2017), pp. 426-430.

Du Boyang et al: "Nesterov Acceleration Gradient Algorithm For Adaptive Generalized Principal Component Extraction", 2019 4th International Conference on Electromechanical Control Technology and Transportation (ICECTT), IEEE, Apr. 26, 2019 (Apr. 26, 2019), pp. 109-112.

* cited by examiner

SOUND SOURCE LOCALIZATION APPARATUS, SOUND SOURCE LOCALIZATION METHOD AND STORAGE MEDIUM

CROSS-REFERENCE TO RELATED APPLICATIONS

The present application is a continuation application of International Application number PCT/JP2021/034092, filed on Sep. 16, 2021, which claims priority under 35 U.S.C § 119(a) to Japanese Patent Application No. 2020-168766, filed on Oct. 5, 2020. The contents of these applications are incorporated herein by reference in their entirety.

BACKGROUND OF THE INVENTION

The present disclosure relates to a sound source localization apparatus, a sound source localization method, and a program for identifying a position of a sound source.

Conventionally, a method for identifying a direction of a sound source has been studied. Japanese Patent No. 6623185 discloses a method for estimating a position of a sound source by estimating various parameters to minimize an objective function representing a difference between a posterior distribution of a source direction and a variational function on the basis of a variational inference method.

When the variational inference method is used as in the conventional method, an estimation value and a variable for obtaining the estimation value are probability variables, and so a plurality of unknown parameters exist. Since a large amount of calculation is required to estimate the plurality of variables, the conventional method using the variable inference is not suitable for real-time localization of a sound source in a meeting.

BRIEF SUMMARY OF THE INVENTION

The present disclosure focuses on this point, and an object of the present disclosure is to shorten a time required for localizing a sound source.

A first aspect of the present disclosure provides a sound source localization apparatus that includes a sound signal vector generation part that generates a sound signal vector based on a plurality of electrical signals outputted from a plurality of microphones that receive a sound generated by a sound source, a subspace identification part that identifies a signal subspace corresponding to a signal component included in the sound signal vector and a noise subspace corresponding to a noise component included in the sound signal vector, a candidate identification part that identifies one or more candidate vectors indicating a plurality of candidates of a direction of the sound source by applying the Delay-Sum Array method to the sound signal vector, and a direction identification part that identifies, as the direction of the sound source, a direction indicated by a sound source direction vector searched using an initial solution based on at least one of the one or more candidate vectors, on the basis of an optimization objective function including a sum of squares of an inner product of the signal subspace and the noise subspace.

A second aspect of the present disclosure provides a sound source localization method comprising the steps, executed by a computer, of generating a sound signal vector based on a plurality of electrical signals outputted by a plurality of microphones that receive a sound generated by a sound source, identifying a signal subspace corresponding to a signal component included in the sound signal vector and a noise subspace corresponding to a noise component included in the sound signal vector, identifying a plurality of candidate vectors indicating a plurality of candidates of a direction of the sound source by applying the Delay-Sum Array method to the sound signal vector, and identifying a direction indicated by a sound source direction vector selected from directions indicated by the plurality of candidate vectors on the basis of a first objective function including a sum of squares of an inner product of the signal subspace and the noise subspace, as the direction of the sound source.

A third aspect of the present disclosure provides a storage medium for non-temporary storage of a program for causing a computer to execute the steps of generating a sound signal vector based on a plurality of electrical signals outputted by a plurality of microphones that receive a sound generated by a sound source, identifying a signal subspace corresponding to a signal component included in the sound signal vector and a noise subspace corresponding to a noise component included in the sound signal vector, identifying a plurality of candidate vectors indicating a plurality of candidates of a direction of the sound source by applying the Delay-Sum Array method to the sound signal vector, and identifying a direction indicated by a sound source direction vector selected from directions indicated by the plurality of candidate vectors on the basis of a first objective function including a sum of squares of an inner product of the signal subspace and the noise subspace, as the direction of the sound source.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

Outline of Microphone System S

Figure 1:
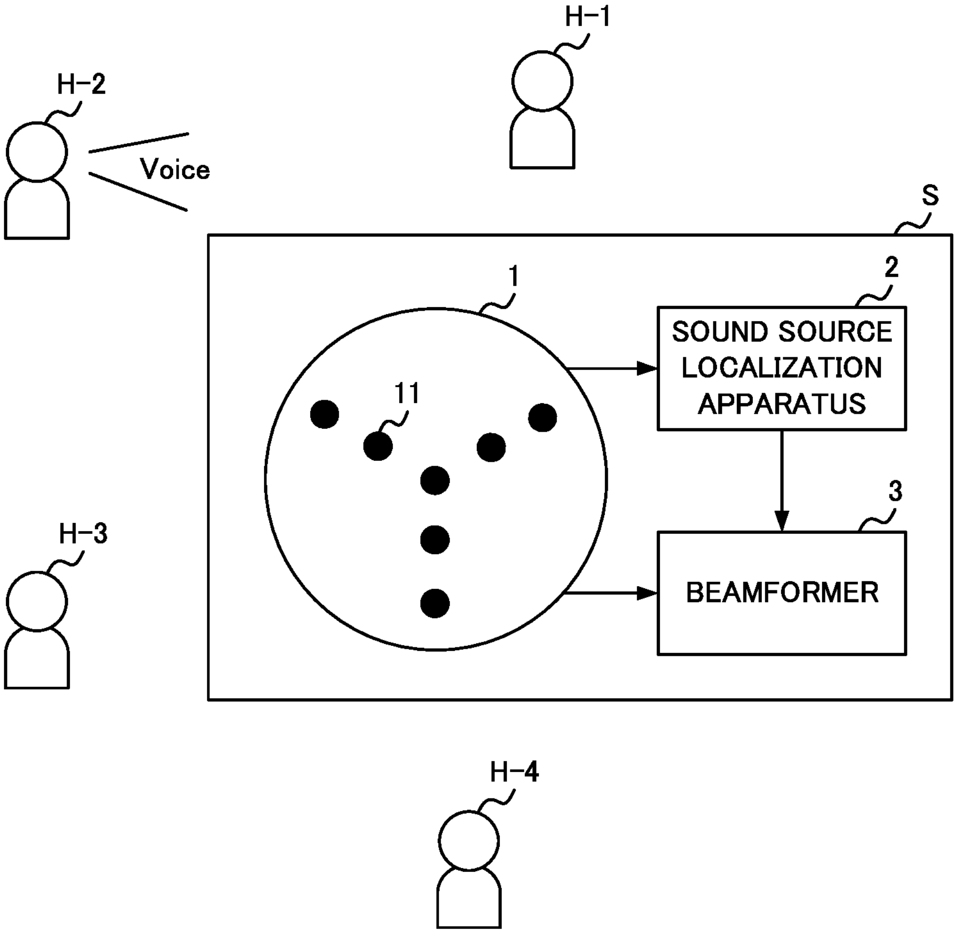
FIG. 1 is a diagram for illustrating an overview of a microphone system.

FIG. 1 is a diagram for illustrating an overview of a microphone system S. The microphone system S includes a microphone array 1, a sound source localization apparatus 2, and a beamformer 3. The microphone system S is a system for collecting voices generated by a plurality of speakers H (speakers H-1 to H-4 in FIG. 1) in a space such as a meeting room or hall.

The microphone array 1 has a plurality of microphones 11 represented by black circles in FIG. 1, and they are installed on a ceiling, a wall surface, or a floor surface of a space where the speakers H stay. The microphone array 1 inputs a plurality of sound signals (for example, electrical signals) based on voices inputted to the plurality of microphones 11, to the sound source localization apparatus 2.

The sound source localization apparatus 2 analyzes the sound signals inputted from the microphone array 1 to identify the direction of the sound source (that is, the speaker H) that generated the voice. As will be described in detail later, the direction of the sound source is represented by a direction around the microphone array 1. The sound source localization apparatus 2 includes a processor, for example, and the processor executes a program to identify the direction of the sound source.

The beamformer 3 performs a beamforming process by adjusting weighting factors of the plurality of sound signals corresponding to the plurality of microphones 11 on the basis of the direction of the sound source identified by the sound source localization apparatus 2. The beamformer 3 makes the sensitivity to the voice generated by the speaker H larger than the sensitivity to a sound coming from a direction other than the direction where the speaker H is present, for example. The sound source localization apparatus 2 and the beamformer 3 may be realized by the same processor.

FIG. 1 shows a state where a speaker H-2 is generating a voice. In the state shown in FIG. 1, the sound source localization apparatus 2 identifies that the voice is generated from the direction of the speaker H-2, and the beamformer 3 performs the beamforming process such that a main lobe of directional characteristics of the microphone array 1 is oriented toward the speaker H-2.

When the microphone system S is used for separating voice by speaker or recognizing speech in a conference, the sound source localization apparatus 2 needs to identify the direction of the speaker during the speech in a short time as the speaker changes to another or moves. Therefore, it is desirable for the sound source localization apparatus 2 to finish the sound source localization process within one frame of the Fourier transformation that is applied to the sound signal, in order to ensure real-time performance. In addition, in order to separate voices of a large number of speakers without errors, the sound source localization apparatus 2 is required to identify the direction of the sound source with high accuracy.

MUltiple SIgnal Classification (MUSIC), which is one of sound source localization methods, is a high-resolution localization method based on the orthogonality of a signal subspace and a noise subspace. This method requires eigenvalue decomposition, and when assuming that the number of microphones 11 is M, the calculation order of MUSIC is $O(M^3)$. Therefore, it is difficult to achieve high-speed processing in real time with MUSIC. Further, if MUSIC is used to identify the direction of the sound source, MUSIC may identify a direction different from the correct direction as the sound source direction, even if there is a single sound source, due to influence of reflection, reverberation, aliasing, and the like. Therefore, MUSIC is insufficient in terms of accuracy.

In order to solve such a problem, the sound source localization apparatus 2 according to the present embodiment uses Projection Approximation Subspace Tracking (PAST) to calculate the signal subspace without performing the eigenvalue decomposition, thereby greatly reducing the amount of calculation. In this method, the signal subspace is sequentially updated for each frame to which the Fourier transformation is applied by using Recursive Least Square (RLS). Therefore, the sound source localization apparatus 2 can calculate the signal subspace at high speed even if the speaker changes to another or moves.

Further, the sound source localization apparatus 2 solves a minimization problem with the MUSIC spectrum denominator term as an objective function to reduce the calculation amount from $O(M^3)$ to $O(M)$. Specifically, the sound source localization apparatus 2 uses Nesterov-accelerated adaptive moment estimation (Nadam), which is one of stochastic gradient descents. Nadam is a method in which Nesterov's Accelerated Gradient Method is incorporated into Adam, and improves a convergence speed to a solution by using gradient information after one iteration. The sound source localization system 2 uses a direction searched by the Delay-Sum Array (DSA) method as an initial solution in order to reduce the number of Nadam iterations.

Specifically, the sound source localization apparatus 2 obtains a plurality of initial solution candidates obtained by the Delay-Sum Array method, and calculates an inner product of each of the plurality of initial solution candidates and the signal subspace obtained by PAST. The sound source localization system 2 uses the initial solution candidate with the largest inner product among the plurality of initial solution candidates as the initial solution of Nadam, thereby enabling the search for a solution in the range around the true direction of the sound source. The sound source localization apparatus 2 calculates the candidates of a direction serving as the initial solution using the Delay-Sum Array method in this way, thereby reducing the number of iterations of processing in Nadam, and converging the minimization problem in a short time to identify the direction of the sound source.

Sound Source Localization Method

Design Model

Figure 2:
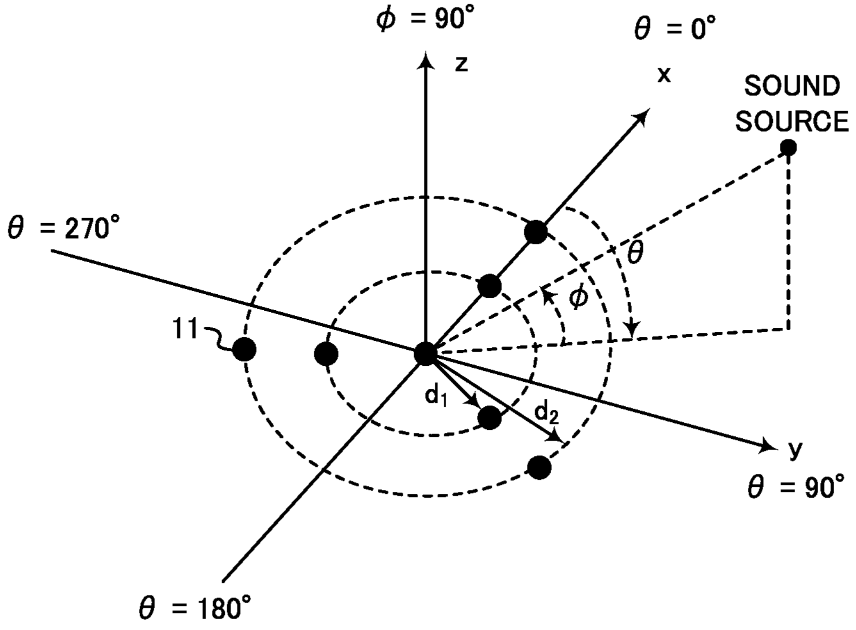
FIG. 2 shows a design model of a microphone array.

FIG. 2 shows a design model of the microphone array 1. In FIG. 2, it is assumed that a signal from a fixed sound source s(n) in a (θL,φL) direction is received by a Y-shaped microphone array. As shown in FIG. 2, each microphone 11 is disposed at a distance of d1 or d2 from the center point. The angles between three directions in which the microphones 11 are arranged are 120 degrees. Here, when the distance between the sound source and the microphone array 1 is sufficiently large, the sound signal can be regarded as a plane wave near the microphone array 1. In this case, a received sound signal X(t,k) can be expressed by the following equations as a sound signal vector in the frequency domain.

[Equation 1]

$$X(t,k)=S(t,k)\alpha_k(\theta_L,\phi_L)+\Gamma(t,k) \quad (1)$$

[Equation 2]

$$a_k(\theta_L,\phi_L)=[e^{-j\omega_k\tau_0},e^{-j\omega_k\tau_1}, \ldots ,e^{-j\omega_k\tau_{M-1}}]^T \quad (2)$$

[Equation 3]

$$\Gamma(t,k)=[\Gamma_0(t,k),\Gamma_1(t,k), \ldots ,\Gamma_{M-1}(t,k)]^T \quad (3)$$

In the above equations, t represents a frame number in the Fourier transformation, k represents a frequency bin number, $\tau_m$ represents an arrival time difference at a microphone m relative to a reference microphone (for example, microphone 11-0), S(t,k) represents a frequency display of a sound source signal, Γ(t,k) represents a frequency display of observed noise, and T represents transpose. The sound source localization is a process of obtaining an estimated value $z_e=[\theta_e,\varphi_e]^T$ of a sound source direction vector $z=[\theta_L,\varphi_L]^T$ from a received sound signal X(t,k) in a certain frame t.

Calculation of Signal Subspace

The sound source localization method uses MUSIC and PAST to calculate the signal subspace. MUSIC is a method for estimating a direction from which the sound signal comes. MUSIC is performed on the basis of the orthogonality between (a) a signal subspace vector $Q_s(t,k)=a_k(\theta_L,\varphi_L)$ which is established by an eigenvector calculated by the eigenvalue decomposition of a correlation matrix $R(t,k)=E[X(t,k)X^H(t,k)]$ and (b) a noise subspace vector $Q_N(t,k)$. E[•] represents an expected value calculation, and H represents the Hermitian transpose. MUSIC uses a MUSIC spectrum $P_k(\theta,\varphi)$ expressed by Equation (4) as an objective function.

[Equation 4]

$$P_k(\theta,\phi)=\frac{a_k^H(\theta,\phi)a_k(\theta,\phi)}{a_k^H(\theta,\phi)Q_N(t,k)Q_N^H(t,k)a_k(\theta,\phi)} \tag{4}$$

$a_k(\theta_L,\varphi_L)$ is a virtual steering vector when it is assumed that the target sound source is in a $(\theta,\varphi)$ direction. When $a_k(\theta,\varphi)=a_k(\theta_L,\varphi_L)$ by the orthogonality of the signal subspace and the noise subspace, the denominator of Equation (4) is 0, and $P_k(\theta,\varphi)$ indicates the maximum value (peak).

The maximum value of Equation (4) needs to be calculated for each frame. Performing the eigenvalue decomposition for each frame increases the calculation load. Therefore, the sound source localization apparatus 2 uses PAST to sequentially update $Q_s(t,k)$ for each frame without performing the eigenvalue decomposition. That is, the sound source localization apparatus 2 calculates $Q_s(t,k)$ while reducing the calculation load, and calculates $Q_N(t,k)$ with which the denominator of Equation (4) is minimized. PAST is a process of obtaining $Q_s(t,k)$ with which $J(Q_s(t,k))$ in Equation (5) is minimized.

[Equation 5]

$$J(Q_S(t,k))=\sum_{l=1}^{t}\beta^{t-l}\|X(l,k)-Q_S(t,k)Q_{PS}^H(l-1,k)X(l,k)\|^2 \tag{5}$$

Equation (5) is an orthogonality objective function whose value becomes small when the orthogonality between the signal subspace vector and the noise subspace vector is large. In Equation (5), β is a forgetting coefficient, and $Q_{PS}^H(l-1,k)$ is an estimation result $Q_s$ of the signal subspace vector in a previous frame. X(l,k) is the sound signal vector, and $Q_s(t,k)Q_{PS}^H(l-1,k)X(l,k)$ is a vector obtained by projecting the sound signal vector onto the signal subspace. The sound source localization apparatus 2 calculates $Q_N(t,k)Q_N^H(t,k)=I-Qs(t,k)Q_S^H(t,k)$ using $Q_s(t,k)$ estimated on the basis of Equation (5). Further, the sound source localization apparatus 2 calculates the MUSIC spectrum $P_k(\theta,\varphi)$ by applying the calculated value to Equation (4). Here, I represents a unit matrix.

By having the sound source localization apparatus 2 calculate $Q_N(t,k)Q_N^H(t,k)$ using PAST, the calculation order required for calculating the MUSIC spectrum decreases from the conventional $O(M^3)$ to O(2M). Accordingly, the sound source localization apparatus can significantly shorten the processing time for identifying the signal subspace vector.

After identifying the noise subspace vector, the sound source localization apparatus 2 uses Nadam, which is one of stochastic gradient descents. The following equation is used for the optimization objective function of Nadam. $J_k(\theta,\varphi)$ in the following equation is the denominator of Equation (4), and a solution that minimizes the denominator corresponds to the direction vector $z_e$.

[Equation 6]

$$J_k(\theta,\phi)=a_k^H(\theta,\phi)Q_N(t,k)Q_N^H(t,k)A_k(\theta,\phi) \tag{6}$$

[Equation 7]

$$\min_{\hat{z}} J_k(\theta,\phi),\ sub.\ \text{to}\ \theta\in[0,2\pi],\ \phi\in\left[0,\frac{\pi}{2}\right] \tag{7}$$

The sound source localization apparatus 2 uses the Delay-Sum Array method to estimate the initial solution candidate when searching for the solution that minimizes $J_k(\theta,\varphi)$, thereby reducing the number of search iterations. A spatial spectrum $Q_k(\theta,\varphi)$ obtained by the Delay-Sum Array method is expressed by Equation (8).

[Equation 8]

$$Q_k(\theta,\phi)=b_k^H(\theta,\phi)R_{DS}(t,k)b_k(\theta,\phi) \tag{8}$$

$R_{DS}(t,k)=E[X_{DS}(t,k)X_{DS}^H(t,k)]$ is the correlation matrix used in the Delay-Sum Array method, and $b_k(\theta,\varphi)$ is a steering vector. The sound source localization apparatus 2 identifies, as the initial solution candidate, a direction in which a value obtained by integrating $Q_k(\theta,\varphi)$ as shown in Equation (9) below is equal to or greater than a predetermined value.

[Equation 9]

$$\overline{Q}(\theta,\phi)=\sum_{k=0}^{K-1}Q_k(\theta,\phi) \tag{9}$$

High accuracy is not required for the initial solution candidate. Therefore, in order to reduce the load for calculating the initial solution candidate, the sound source localization apparatus 2 may thin out frequency bins k and directions $(\theta,\varphi)$ to set the roughness of the frequency bin k and the direction $(\theta,\varphi)$ to such a degree that the calculation of the initial solution candidate is finished within one frame.

However, depending on the calculation result of Equation (9), a peak may appear at a position away from a true peak direction $(\theta_L,\varphi_L)$. This occurs when the spatial spectrum $Q_k(\theta,\varphi)$ is affected by aliasing, reflection, reverberation, or the like. Therefore, the sound source localization apparatus 2 may obtain R pieces of peaks as the initial solution candidates during the peak search based on Equation (9), and calculate the reliability using Equation (10).

[Equation 10]

$$\omega_k(\theta_r,\phi_r)=\|b_k^H(\theta_r,\phi_r)Q_S(t,k)\|^2,\ r\in[1,\ldots,R] \tag{10}$$

Equation (10) is a sum of squares of an inner product of the initial solution candidate and the signal subspace vector obtained using PAST. The result obtained from Equation (10) indicates that the direction $(\theta_r,\varphi_r)$ that takes a larger value is close to the signal subspace vector established by $Q_s(t,k)$. The sound source localization apparatus 2 identifies the peak with the highest reliability as the initial solution z', as shown in Equation (11).

[Equation 11]

$$\max_{z}\sum_{k}\psi_k(\theta_r,\phi_r),\ \forall\ r \tag{11}$$

After determining the initial solution is z', the sound source localization apparatus 2 calculates, assuming that $z_e=z'$, $(\theta_k,\varphi_k)$ corresponding to each frequency bin with the Nadam method that uses Equation (6). The sound source localization apparatus 2 estimates a value obtained by averaging $(\theta_k,\varphi_k)$ corresponding to each of these frequency bins as a new sound source direction vector $z_e$. By obtaining the initial solution z' by using the method described above before searching for a solution by using Nadam, the sound source localization apparatus 2 can search for a solution close to the signal subspace established by the sound source signal in a short time.

Configuration of Sound Source Localization Apparatus 2

Figure 3:
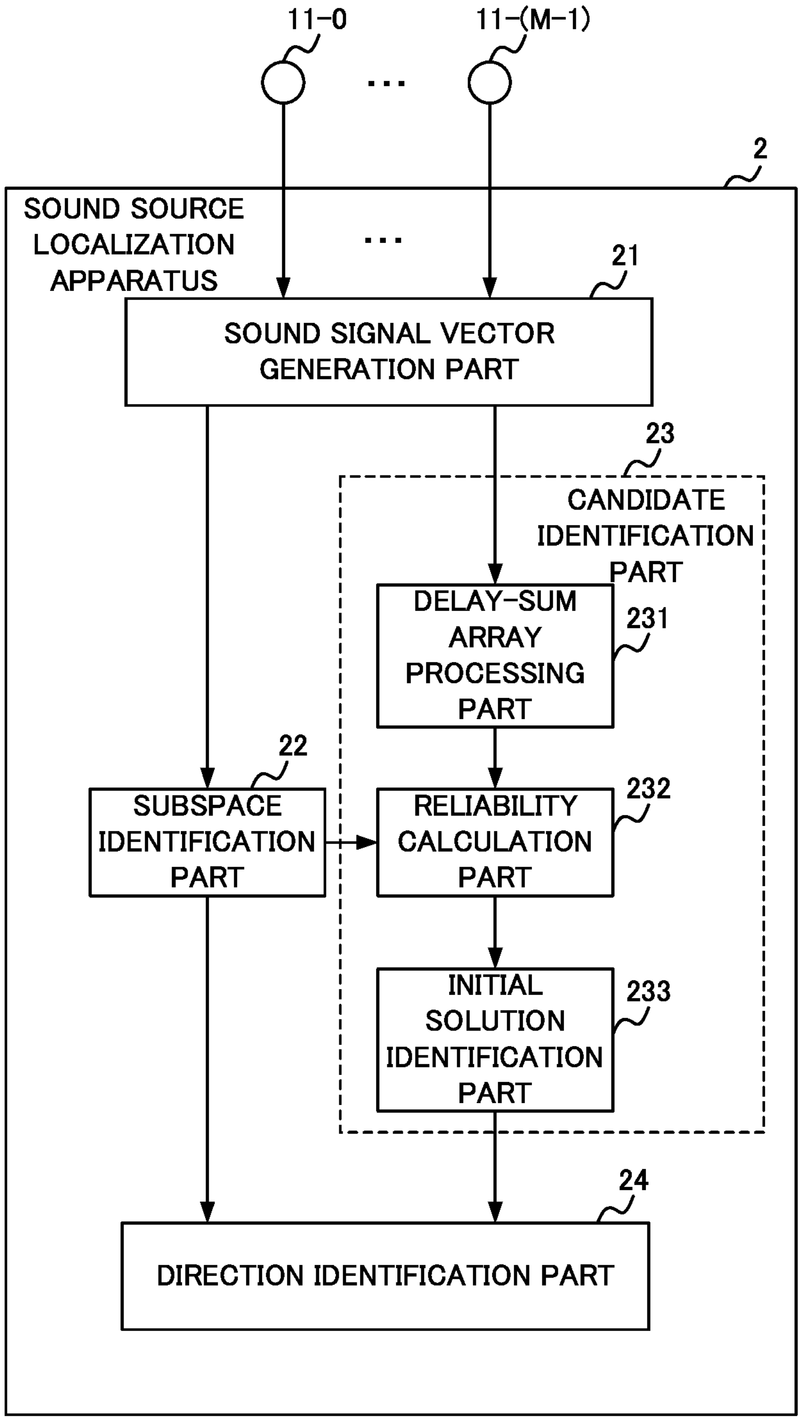
FIG. 3 shows a configuration of a sound source localization apparatus.

FIG. 3 shows a configuration of the sound source localization apparatus 2. The operation of each unit for the sound source localization apparatus 2 to perform the sound source localization method will be described with reference to FIG. 3 below. The sound source localization apparatus 2 includes a sound signal vector generation part 21, a subspace identification part 22, a candidate identification part 23, and a direction identification part 24. The candidate identification part 23 includes a Delay-Sum Array processing part 231, a reliability calculation part 232, and an initial solution identification part 233. The sound source localization apparatus 2 functions as the sound signal vector generation part 21, the subspace identification part 22, the candidate identification part 23, and the direction identification part 24 by executing a program stored in a memory by a processor.

The sound signal vector generation part 21 generates a sound signal vector. The sound signal vector is generated on the basis of a plurality of electrical signals outputted by the plurality of microphones 11 that received the voice emitted by the sound source. Specifically, the sound signal vector generation part 21 generates the sound signal vector in the frequency domain by performing the Fourier transformation (for example, fast Fourier transformation) on the plurality of electrical signals inputted from the plurality of microphones 11. The sound signal vector generation part 21 inputs the generated sound signal vector to the subspace identification part 22 and the candidate identification part 23.

The subspace identification part 22 identifies (a) the signal subspace corresponding to the signal component included in the sound signal vector and (b) the noise subspace corresponding to the noise component included in the sound signal vector. The subspace identification part 22 identifies the signal subspace vector and the noise subspace vector by using PAST, for example. The signal subspace vector and the noise subspace vector are identified on the basis of the orthogonality objective function shown in Equation (5) that is based on the difference between the sound signal vector and a vector obtained by projecting said sound signal vector onto the signal subspace.

The candidate identification part 23 identifies one or more candidate vectors by applying the Delay-Sum Array method to the sound signal vector. The one or more candidate vectors correspond to one or more directions assumed as the direction of the sound source (that is, direction from which the sound signal come). Then, the candidate identification part 23 identifies a candidate vector, among the one or more identified candidate vectors, for which a sum of squares of the inner product with the signal subspace vector satisfies a predetermined reliability condition. The reliability condition is that the sum of squares of the inner product of the candidate vector and the signal subspace vector is equal to or greater than a threshold value, for example. The reliability condition is that the likelihood of a sum of squares of an inner product of (a) a probability distribution of the sound signal arriving from a predicted direction and (b) a direction indicated by the candidate vector is relatively large. The identified candidate vector is used as an initial solution when the direction identification part 24 executes a process of searching for the direction of the sound source. The candidate identification part 23 may perform an operation of identifying the one or more candidate vectors in parallel with the process performed by the subspace identification part 22, or may perform the operation of identifying the one or more candidate vectors after the subspace identification part 22 performs the process of identifying the signal subspace vector and the noise subspace vector.

In order to reduce the load for calculating the initial solution candidate, the candidate identification part 23 may determine the frequency bin k and the direction $(\theta,\varphi)$ such that a calculation of the one or more candidate vectors as the initial solution candidate can be finished within one frame of the Fourier transformation that is applied to the sound signal. The candidate identification part 23 thins out the plurality of frequency bins generated by the Fourier transformation on the sound signal to determine the frequency bin k and the direction $(\theta,\varphi)$, for example.

The Delay-Sum Array processing part 231 uses a known Delay-Sum Array method to estimate the plurality of candidate vectors indicating a plurality of possible directions from which the sound signal come, on the basis of a difference in time at which the sound signal emitted from the sound source arrives at each microphone 11. Subsequently, the reliability calculation part 232 uses Equation (10) to calculate the reliability of each direction corresponding to the plurality of candidate vectors estimated by the Delay-Sum Array processing part 231. The initial solution identification part 233 inputs the candidate vector having the highest reliability calculated by the reliability calculation part 232 to the direction identification part 24, as the initial solution of the search process performed by the direction identification part 24.

The direction identification part 24 identifies the direction of the sound source on the basis of the optimization objective function expressed by Equation (6) including a sum of squares of an inner product of the signal subspace vector and the noise subspace vector identified by the subspace identification part 22. The direction identification part 24 identifies, as the direction of the sound source, the direction indicated by the sound source direction vector searched by using the initial solution based on at least any of the one or more candidate vectors identified by the subspace identification part 22. Specifically, the direction identification part 24 uses the stochastic gradient descent using the optimization objective function expressed by Equation (6) to identify the sound source direction vector.

The direction identification part 24 identifies the direction of the sound source for each frame of the Fourier transformation. Then, the direction identification part 24 identifies the direction of the sound source on the basis of an average direction vector. The average direction vector is obtained by averaging the plurality of sound source direction vectors corresponding to the plurality of frequency bins generated by the Fourier transformation.

Flowchart of Process of Sound Source Localization Apparatus 2

Figure 4:
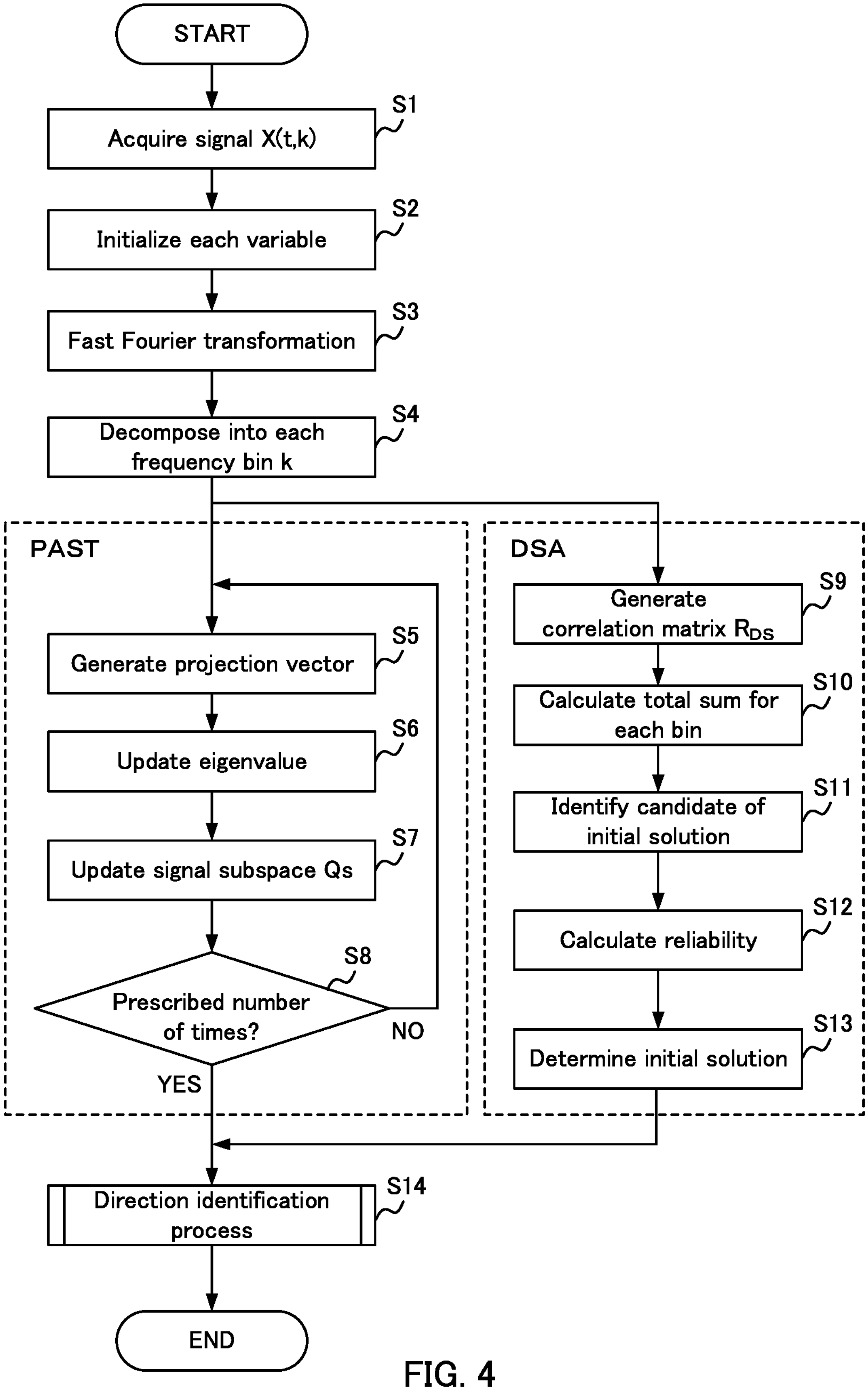
FIG. 4 is a flowchart of a process of the sound source localization apparatus executing a sound source localization method.

FIG. 4 is a flowchart of a process of the sound source localization apparatus 2 executing the sound source localization method. When the sound signal vector generation part 21 acquires the electrical signal corresponding to the sound signal X(t,k) from the microphone array 1 (step S1), the sound signal vector generation part 21 initializes each variable (step S2). The sound signal vector generation part 21 performs the fast Fourier transformation on the sound signal X(t,k) (step S3) to generate the sound signal vector in a frequency domain formed by the frequency bin k (k is a natural number) (step S4).

Subsequently, the subspace identification part 22 projects the sound signal vector onto the signal subspace to generate the projection vector (step S5). The subspace identification part 22 updates the eigenvalue on the basis of Equation (5) (step S6), and updates the signal subspace vector Qs(t,k) (step S7). The subspace identification part 22 determines whether or not the process from step S5 to S7 has been executed for a prescribed number of times (step S8). When the subspace identification part 22 determines that the process has been executed for the prescribed number of times, the subspace identification part 22 inputs the latest signal subspace vector to the direction identification part 24.

In parallel with the process from step S5 to S8, the candidate identification part 23 generates the correlation matrix $R(t,k)=E[X(t,k)X^H(t,k)]$ (step S9), and uses Equation (9) to calculate a sum total for each frequency bin (step S10). The candidate identification part 23 identifies the vector indicating a direction whose value obtained by the calculation satisfies a predetermined condition (for example, the direction is equal to or greater than a threshold value) as a candidate of the initial solution (step S11). Further, the candidate identification part 23 calculates the reliability of the identified initial solution candidate using Equation (10) (step S12), and determines the initial solution candidate with the highest reliability as the initial solution (step S13).

The candidate identification part 23 notifies the direction identification part 24 about the determined initial solution. The direction identification part 24 identifies the direction of the sound source by using the optimization objective function shown in Equation (6) on the basis of the signal subspace vector notified from the subspace identification part 22 and the initial solution notified from the candidate identification part 23 (step S14).

Figure 5:
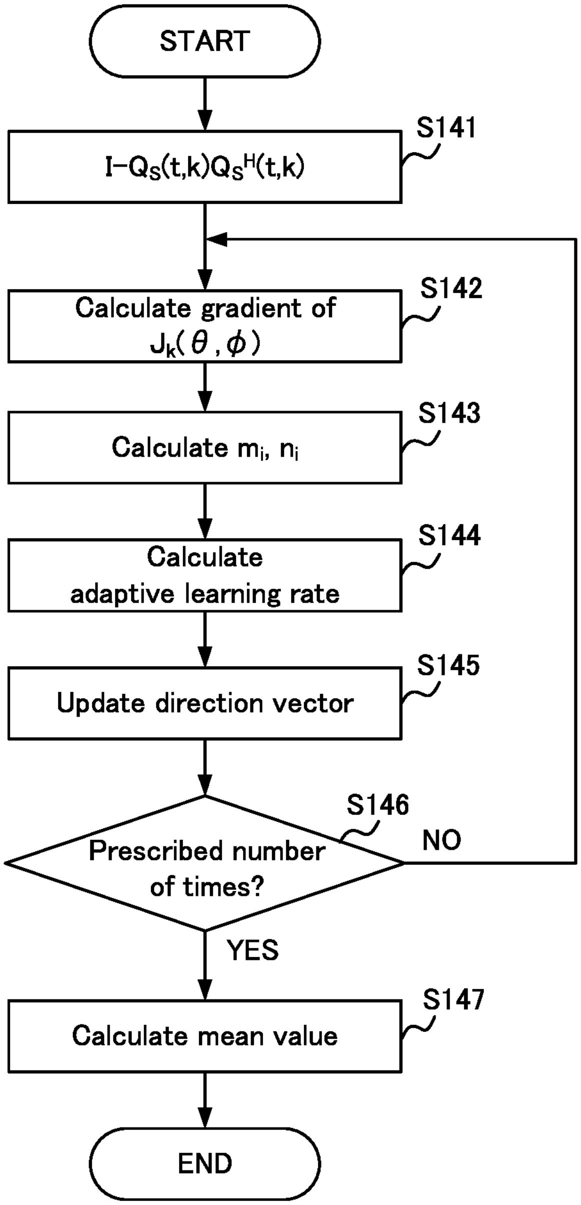
FIG. 5 is a flowchart of a process of a direction identification part that identifies a direction of a sound source.

FIG. 5 is a flowchart of the process (step S14) of the direction identification part 24 that identifies the direction of the sound source. First, the direction identification part 24 calculates $Q_N(t,k)Q_N^H(t,k)=I-Q_S(t,k)Q_S^H(t,k)$ (step S141), and calculates, on the basis of the calculated result, the gradient of $J_k(\theta,\varphi)$ shown in Equation (6) (step S142). Subsequently, the direction identification part 24 calculates a primary moment mi and a secondary moment $n_i$ to be used for the process of Nadam (step S143), and calculates an adaptive learning rate by Nesterov's Accelerated Gradient Method (step S144). The direction identification part 24 updates the solution of the direction vector on the basis of the calculated adaptive learning rate (step S145).

The direction identification part 24 repeats the process from step S142 to S145 until said process has been executed for a prescribed number of times, and calculates the mean value of the solutions of the direction vectors obtained for all the frequency bins, thereby identifying the direction of the sound source (step S147).

Results of Real Environment Experiments

In order to show the effectiveness of the sound source localization method according to the present embodiment, a real environment experiment was performed. The meeting room 1 and the meeting room 2 at the head office of Audio-Technica Corporation were used as a sound signal recording environment. The size of the meeting room 1 was 5.3 [m]*4.7 [m]*2.6 [m], and the reverberation time was 0.17 seconds. The size of the meeting room 2 was 12.9 [m]*6.0 [m]*4.0 [m], and the reverberation time was 0.80 seconds. An exhaust sound of a personal computer and an air conditioning sound existed as an ambient noise.

A male voice was played through a loudspeaker installed in each meeting room as the sound source, while the voice was recorded with the microphone array 1. Table 1 shows true values of the sound source direction and the distance Sd between the microphone array 1 and the speaker.

TABLE 1

| | Meeting room 1 | Meeting room 2 |
|---|---|---|
| $\theta_L$[°] | 350 | 297 |
| $\varphi_L$[°] | 65 | 70 |
| $S_L$[m] | 2 | 3.7 |

In this experiment, the number of microphones M=7, $d_1$=15 [mm], $d_2$=43 [mm], sampling frequency $f_s$=12 [kHz], frame length K=128, 50% overlap, frequency band used 2 [kHz] to 5 [kHz], forgetting factor β of PAST=0.96, and R=2. Further, the step size of Nadam was 0.1. A computer having Intel Core (registered trademark) i7-7700HQ CPU (2.80 GHz), RAM 16 GB was used for measuring the processing time. A value of the deviation between an estimated direction of the sound source and the true value was evaluated using the mean absolute error $\delta=[\delta_0,\delta_\varphi]$ shown in Equation (12). $z=[\theta_L,\varphi_L]^T$ is the true value direction of the sound source.

[Equation 12]

$$\delta = \sqrt{\frac{1}{T}\sum_t (z-\hat{z})^2} \tag{12}$$

The sound source localization method according to the present embodiment (hereinafter, this method is referred to as "the present method."), a comparison method 1, and a comparison method 2 were used as the sound source localization method. The comparison method 1 was the same as the present method except that the reliability was not checked by Equation (10). The comparison method 2 was a method of peak-searching the MUSIC spectrum by the eigenvalue decomposition. It should be noted that, when calculating the evaluation value of Equation (12), the evaluation value was calculated except for a silent section.

Table 2 shows the mean absolute error δ of the result measured using each method. From Table 2, it can be confirmed that the error with respect to the true value was less than 5[°] when the present method and the comparison method 2 were used. On the other hand, the error of the comparison method 1 that did not perform the reliability confirmation was larger than that of the present method. The comparison method 2 tended to have a slightly smaller error than the present method because it directly peak-searched the MUSIC spectrum.

TABLE 2

| | Meeting room 1 | | Meeting room 2 | |
|---|---|---|---|---|
| | $\delta_\theta$ [°] | $\delta_\varphi$ [°] | $\delta_\theta$ [°] | $\delta_\varphi$ [°] |
| Present method | 3.3 | 0.8 | 4.2 | 4.5 |
| Comparison method 1 | 4.1 | 0.8 | 5.7 | 5.4 |
| Comparison method 2 | 3.0 | 2.8 | 3.7 | 2.6 |

Further, the average calculation time per second, $RTF=S_c/S_l$, of the signal length for each method was compared. Here, $S_c$ was the calculation time (second), and $S_l$ was the signal length (second). If the average calculation time was less than 1 (second), the sound source localization in real time was possible.

Table 3 shows the average calculation time of each method. In the present method and the comparison method 1, the average calculation time was much less than 1 (second), indicating that real-time performance could be ensured. On the other hand, in the comparison method 2, the average calculation time was much higher than 1 (second), indicating that the real-time performance could not be ensured.

TABLE 3

| | Average calculation time [sec] |
|---|---|
| Present method | 0.21 |
| Comparison method 1 | 0.20 |
| Comparison method 2 | 5.20 |

From the above-described experiment results, it was found that the sound source localization method according to the present embodiment could localize the sound source in real time while ensuring sufficient accuracy.

Effects of Sound Source Localization Apparatus 2 According to Present Embodiment As described above, the sound source localization apparatus 2 according to the present embodiment calculates the signal subspace at high speed, without performing the eigenvalue decomposition, by using PAST for calculating the eigenvectors used for MUSIC. The sound source localization apparatus 2 identifies the initial solution candidates by using the Delay-Sum Array method before calculating the optimal solutions using Nadam with the denominator of the MUSIC spectrum as an objective function. The sound source localization apparatus 2 determines the initial solution on the basis of the reliability of the initial solution candidate identified by the Delay-Sum Array method, thereby shortening the search time of the optimal solution. From the real environment experiment, it was confirmed that the sound source localization method performed by the sound source localization apparatus 2 could ensure the real-time performance and suppress the localization error to less than 5°.

It should be noted that, in the above description, the operation was confirmed using a fixed sound source. But the sound source localization method according to the present embodiment can be applied even if the sound source moves. The sound source localization method according to the present embodiment can search for the optimal solution at high speed. Therefore, the sound source localization method according to the present embodiment enables high-speed and high-accuracy tracking of the sound source. Further, in the above description, Nadam is illustrated as a means of searching for the optimal solution, but Nadam is not the only means of searching for the optimal solution, and other means of solving the minimization problem may be used.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. A sound source localization apparatus comprising:

a sound signal vector generation part that generates a sound signal vector based on a plurality of electrical signals outputted from a plurality of microphones that receive a sound generated by a sound source;

a subspace identification part that identifies a signal subspace corresponding to a signal component included in the sound signal vector and a noise subspace corresponding to a noise component included in the sound signal vector;

a candidate identification part that identifies one or more candidate vectors indicating a plurality of candidates of a direction of the sound source by applying a Delay-Sum Array method to the sound signal vector; and a direction identification part that identifies, as the direction of the sound source, a direction indicated by a sound source direction vector searched using an initial solution based on at least one of the one or more candidate vectors, on the basis of an optimization objective function including a sum of squares of an inner product of the signal subspace and the noise subspace, wherein the candidate identification part identifies the initial solution for which a sum of squares of an inner product of the signal subspace vector corresponding to the signal subspace satisfies a predetermined reliability condition, among the one or more candidate vectors identified by applying the Delay-Sum Array method to the sound signal vector.

2. The sound source localization apparatus according to claim 1, wherein the candidate identification part performs a process of identifying the one or more candidate vectors in parallel with a process of identifying the signal subspace and the noise subspace by the subspace identification part.

3. The sound source localization apparatus according to claim 1, wherein the sound signal vector generation part generates the sound signal vector by performing a Fourier transformation on the plurality of electrical signals, and the direction identification part identifies the direction of the sound source for each frame of the Fourier transformation.

4. A sound source localization apparatus comprising:

a sound signal vector generation part that generates a sound signal vector based on a plurality of electrical signals outputted from a plurality of microphones that receive a sound generated by a sound source, wherein the sound signal vector generation part generates the sound signal vector by performing a Fourier transformation on the plurality of electrical signals;

a subspace identification part that identifies a signal subspace corresponding to a signal component included in the sound signal vector and a noise subspace corresponding to a noise component included in the sound signal vector;

a candidate identification part that identifies one or more candidate vectors indicating a plurality of candidates of a direction of the sound source by applying a Delay-Sum Array method to the sound signal vector; and a direction identification part that identifies, as the direction of the sound source, a direction indicated by a sound source direction vector searched using an initial solution based on at least one of the one or more candidate vectors, on the basis of an optimization objective function including a sum of squares of an inner product of the signal subspace and the noise subspace, wherein direction identification part identifies the direction of the sound source for each frame of the Fourier transformation, and the direction identification part identifies the direction of the sound source on the basis of an average direction vector obtained by averaging a plurality of the sound source direction vectors corresponding to a plurality of frequency bins generated by the Fourier transformation.

5. The sound source localization apparatus according to claim 4, wherein the candidate identification part identifies the one or more candidate vectors by thinning out the frequency bins such that calculation of the one or more candidate vectors can be finished within one frame of the Fourier transform that is applied to the plurality of electrical signals.

6. The sound source localization apparatus according to claim 3, wherein the direction identification part identifies the sound source direction vector by using a stochastic gradient descent using the optimization objective function expressed by the following equation $$J_k(\theta, \phi) = a_k^H(\theta, \phi) Q_N(t, k) Q_N^H(t, k) a_k(\theta, \phi) \quad \text{[Equation 13]}$$

where $(\theta, \phi)$ is a direction, $a_k(\theta_L, \phi_L)$ is a virtual steering vector when it is assumed that there is a target sound source in $\theta$ and $\phi$ directions, t is a frame number, k is a frequency bin number, and $Q_N(t,k)$ is a noise subspace vector.

7. The sound source localization apparatus according to claim 3, wherein the subspace identification part identifies the signal subspace on the basis of an orthogonality objective function based on a difference between the sound signal vector and a vector obtained by projecting the sound signal vector onto the signal subspace.

8. The sound source localization apparatus according to claim 7, wherein the subspace identification part identifies the signal subspace on the basis of the orthogonality objective function expressed by the following equation $$J(Q_S(t, k)) = \sum_{l=1}^{t} \beta^{t-1} \| X(l, k) - Q_S(t, k) Q_{PS}^H(l-1, k) X(l, k) \|^2 \quad \text{[Equation 14]}$$

where $\beta$ is a forgetting function, t is a frame number, k is a frequency bin number, $Q_s(t,k)$ is a signal subspace vector, $Q_{PS}{}^H(l-1,k)$ is an estimation result of the signal subspace vector in a previous frame, and X is a sound signal.

9. A sound source localization method comprising the steps, executed by a computer, of:

generating a sound signal vector based on a plurality of electrical signals outputted by a plurality of microphones that receive a sound generated by a sound source;

identifying a signal subspace corresponding to a signal component included in the sound signal vector and a noise subspace corresponding to a noise component included in the sound signal vector;

identifying a plurality of candidate vectors indicating a plurality of candidates of a direction of the sound source by applying a Delay-Sum Array method to the sound signal vector, wherein the identifying a plurality of candidate records identifies an initial solution for which a sum of squares of an inner product of the signal subspace vector corresponding to the signal subspace satisfies a predetermined reliability condition, among the one or more candidate vectors identified by applying the Delay-Sum Array method to the sound signal vector; and identifying a direction indicated by a sound source direction vector selected from directions indicated by the plurality of candidate vectors on the basis of a first objective function including a sum of squares of an inner product of the signal subspace and the noise subspace, as the direction of the sound source.

10. The sound source localization apparatus according to claim 4, wherein the direction identification part identifies the sound source direction vector by using a stochastic gradient descent using the optimization objective function expressed by the following equation $$J_k(\theta, \phi) = a_k^H(\theta, \phi) Q_N(t, k) Q_N^H(t, k) a_k(\theta, \phi) \quad \text{[Equation 13]}$$

where $(\theta,\phi)$ is a direction, $a_k(\theta_L, \phi_L)$ is a virtual steering vector when it is assumed that there is a target sound source in $\theta$ and $\phi$ directions, t is a frame number, k is a frequency bin number, and $Q_N(t,k)$ is a noise subspace vector.

11. The sound source localization apparatus according to claim 4, wherein the subspace identification part identifies the signal subspace on the basis of an orthogonality objective function based on a difference between the sound signal vector and a vector obtained by projecting the sound signal vector onto the signal subspace.

12. The sound source localization apparatus according to claim 11, wherein the subspace identification part identifies the signal subspace on the basis of the orthogonality objective function expressed by the following equation $$J(Q_S(t,k)) = \sum_{l=1}^{t} \beta^{t-l} \left\| X(l,k) - Q_S(t,k) Q_{PS}^H(l-1,k) X(l,k) \right\|^2 \quad \text{[Equation 14]}$$

where $\beta$ is a forgetting function, t is a frame number, k is a frequency bin number, Qs(t,k) is a signal subspace vector, $Q_{PS}{}^H(l-1,k)$ is an estimation result of the signal subspace vector in a previous frame, and X is a sound signal.

* * * * *